Nov. 1, 1932. J. COYLE ET AL 1,885,992
MACHINE FOR SOLDERING NOZZLES TO CAN BODIES
Filed July 27, 1931 4 Sheets-Sheet 1

Inventors:
JOHN COYLE &
WALTER PLUMB
By Sturtevant Mason & Porter
Attorneys.

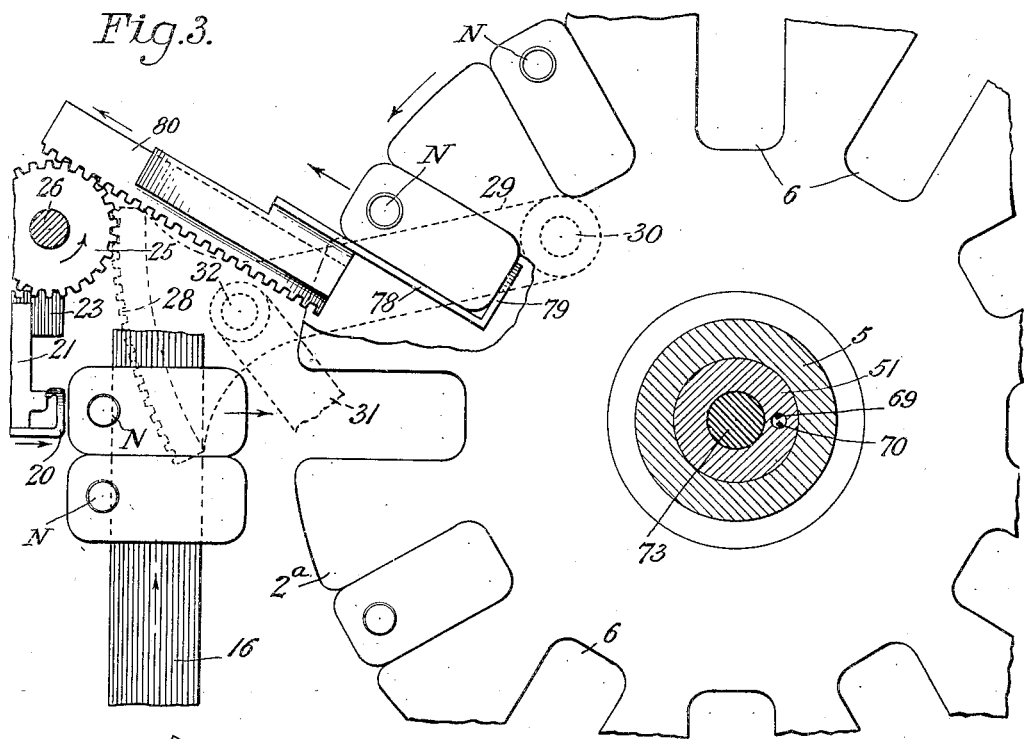
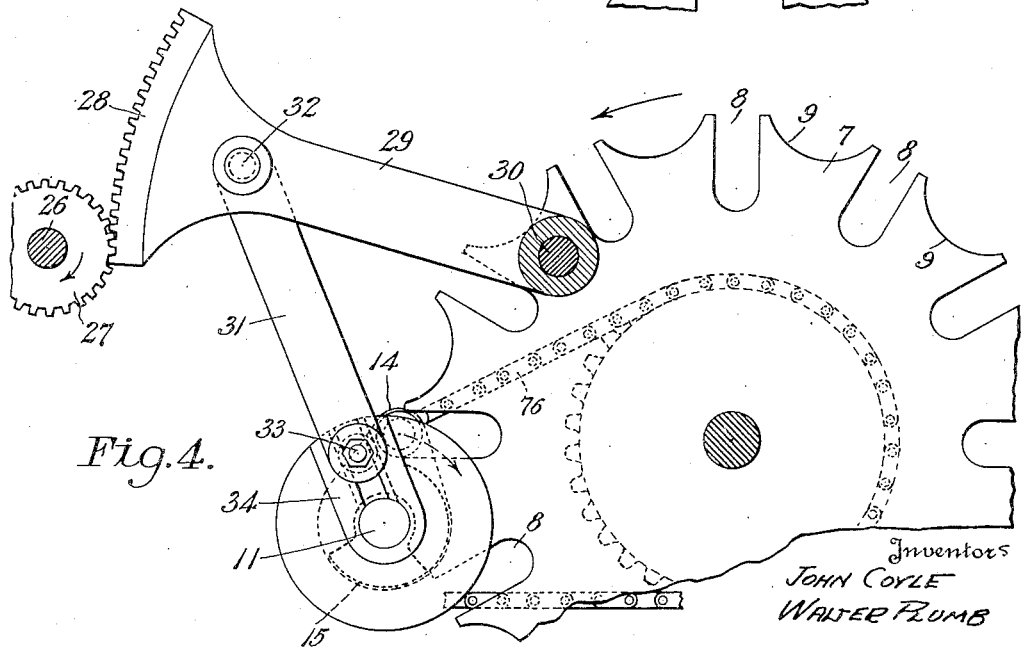

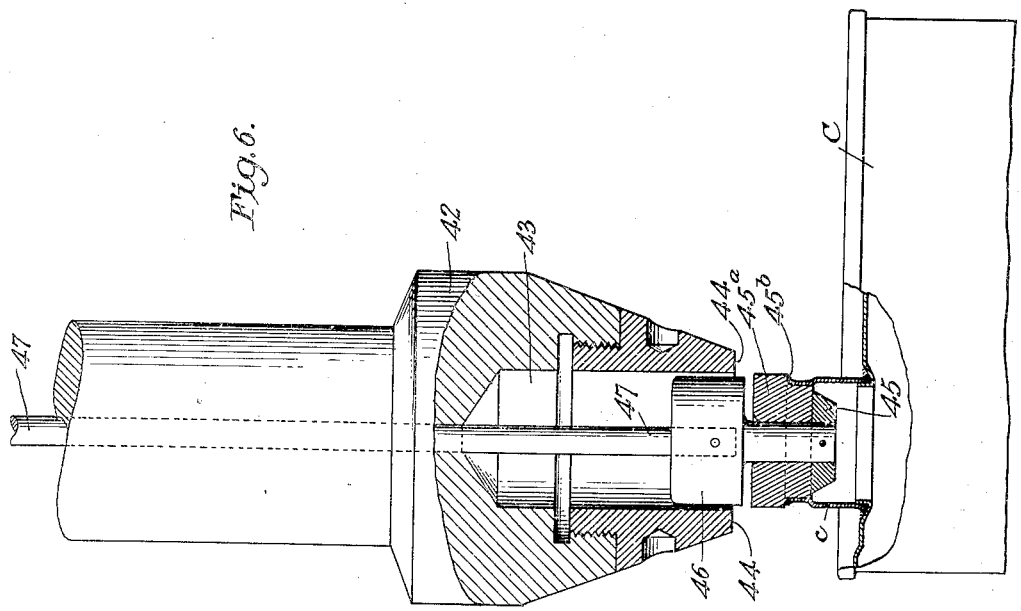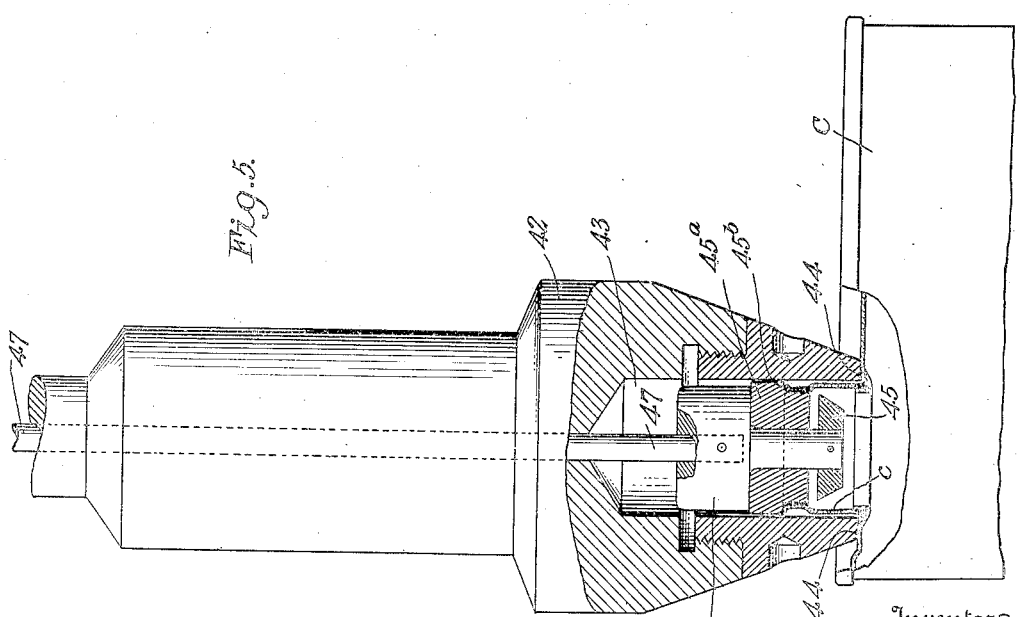

Patented Nov. 1, 1932

1,885,992

UNITED STATES PATENT OFFICE

JOHN COYLE, OF BALTIMORE, MARYLAND, AND WALTER PLUMB, OF JERSEY CITY, NEW JERSEY, ASSIGNORS TO CONTINENTAL CAN COMPANY, INC., OF NEW YORK, N. Y., A CORPORATION OF NEW YORK

MACHINE FOR SOLDERING NOZZLES TO CAN BODIES

Application filed July 27, 1931. Serial No. 553,428.

The invention relates to new and useful improvements in a soldering machine adapted to solder parts to a can body, and more particularly a nozzle to a can body.

An object of the invention is to provide a machine having a plurality of soldering units traveling past a receiving station where the can body and the nozzle to be attached thereto are loaded on to a traveling turret associated with the soldering units, and wherein the soldering units are moved into contact with the parts to be soldered during the travel of the soldering units.

A further object of the invention is to provide a machine of the above type wherein each soldering unit includes a soldering iron which is rotated continuously during the soldering of the part to the can body.

A still further object of the invention is to provide a machine of the above type wherein each soldering unit is provided with means for engaging the nozzle for centering the same beneath the soldering iron, and also with means for pressing the nozzle against the can body as the iron is retracted and while the solder is cooling.

In the drawings which show by way of illustration one embodiment of the invention—

Fig. 3 is a sectional view on the line 3—3 of Fig. 1;

Fig. 4 is a sectional view on the line 4—4 of Fig. 1;

Fig. 5 is an enlarged view showing the soldering iron as moved into position for soldering the nozzle to the can body, and Fig. 6 is a view similar to Fig. 5, but showing the iron as partially retracted from engagement around the nozzle.

Figure 1:
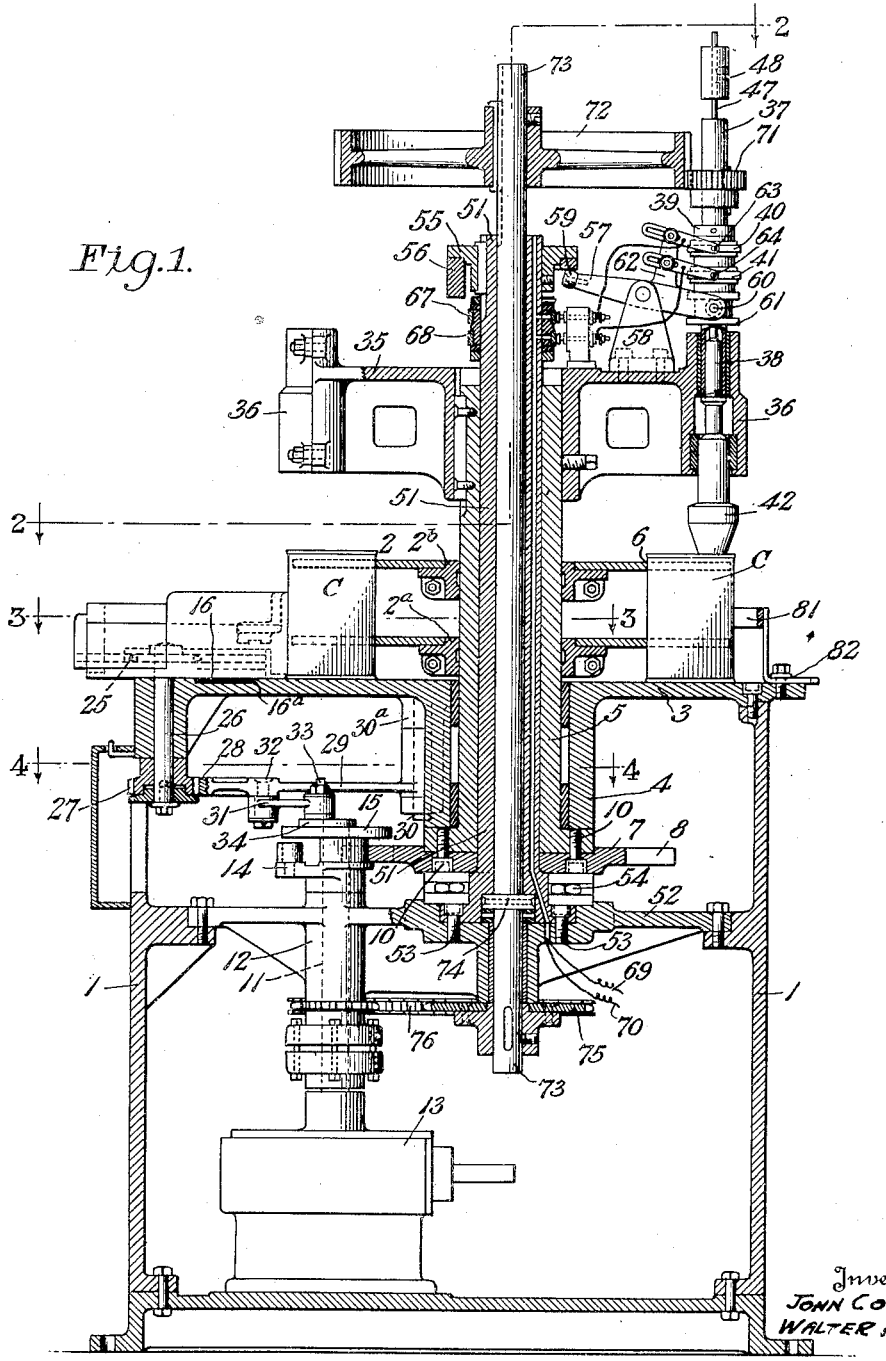
Figure 1 is a vertical sectional view through a machine embodying the improvements, only one of the soldering units being shown.

The invention is directed to a machine for soldering small parts to can bodies, and more particularly for soldering a nozzle to a can body. The machine as designed is particularly adapted for attaching nozzles to can bodies which are rectangular in cross section. The machine includes a rotating turret having a series of pockets into which the can bodies are fed at the feeding-in station. The pockets are shaped so as to position the can body on the turret in a predetermined set position. Associated with each pocket in the turret is a soldering unit which includes a soldering iron, preferably electrically heated. The soldering iron has a recess in the lower face thereof, thus forming an annular soldering iron surface. The iron passes down over the nozzle and the annular soldering surface heats the solder which attaches the nozzle at the lower end thereof to the can body. Located within the iron is a centering device which moves into the nozzle as the iron moves down over the nozzle, and this centers the nozzle relative to the opening in the container body. The iron is moved up and down to bring it into contact with the parts for the soldering operation. This is accomplished by a lever associated with the iron and cooperating with a stationary cam which is so shaped as to bring the iron into proper position for soldering. The turret is intermittently rotated and comes to a standstill while the can body is being placed thereon. The soldering iron is continuously rotated, so that the iron is traveling around the nozzle during the soldering operation.

Referring more in detail to the drawings, the invention, as shown, is embodied in a machine which includes a supporting frame 1 on which a turret 2 is mounted for rotation. The supporting frame 1 is provided with a table top 3 which is formed with a depending bearing sleeve 4. Located within the sleeve is a rotating sleeve shaft 5. There are two turrets, a lower turret 2ª and an upper turret 2ᵇ. These turrets are fixed to clamping collars which in turn are fixed to this sleeve shaft 5, so that as the sleeve shaft is intermittently rotated, the turrets will be intermittently rotated. Each turret is provided with a series of pockets 6, and these pockets are located one above the other in the two turrets.

The turret is intermittently rotated by a Geneva stop motion. This includes a disk 7 having a series of radial slots 8 therein, and a curved surface 9 between the radial slots.

This disk 7 is secured by suitable bolts 10, 10 to the lower end of the sleeve shaft 5. Said sleeve shaft is provided with a flanged head into which these bolts are threaded. Located within the frame of the machine is a vertical actuating shaft 11. Said shaft is mounted in a suitable sleeve bearing 12 carried by the frame 1. The shaft is driven from a speed reducer 13 of the usual construction. On the upper end of this shaft is a crank 14 carrying a roller which is adapted to engage the radial slots 8, 8, one after another, for the purpose of moving the disk 7 through one step movement. As the roller moves out of the slot, the curved segment 15 carried by the shaft engages the curved portion 9 of the disk and locks the disk from movement while the roller is out of engagement with the radial slots.

The can bodies to which nozzles are to be attached are delivered to the machine by a traveling conveyor belt 16 running over pulleys 17 and 18. The table top 3 is provided with a groove 16$^a$ in which the belt runs so that the top of the belt is flush with the table. This belt is moving continuously, and the can bodies are carried along the same between suitable guide rails 19, 19.

The can bodies are fed against a stop 20$^a$ by the belt 16. A pusher 20 moves in a direction at right angles to the travel of the belt. When the pusher is retracted, the cans are carried forward against the stop, and when the pusher is moved forward, the cans are advanced thereby into the pocket in the turret. This pusher is in the form of a plate which is bent at right angles thereto in order to provide a head which is adapted to engage a can body and move the same into the pocket in the turret. The can bodies are indicated at C in the drawings. The pusher 20 is adjustably connected to a bracket 21 by means of a bolt 22 which passes through a slot in the bracket extending in a direction parallel with the direction of travel of the belt. The bracket is secured to a rack bar 23 by a bolt 24 which passes through a slot in the bracket and permits the bracket to be adjusted in a direction at right angles to the belt. Thus it is that the pusher plate 20 may be shifted either laterally of the belt or longitudinally of the belt. The rack bar 23 engages a pinion 25 attached to the upper end of a shaft 26. At the lower end of the shaft 26 is a gear wheel 27 which meshes with a segment rack 28 carried by an arm 29 pivoted at 30 to a lug 30$^a$ carried by the sleeve bearing 4. A link 31 is pivoted at 32 to the arm 29. This link is connected to a crank pin 33 attached to an arm 34 fixed to the upper end of the shaft 11. The crank pin 33 is adjustable on this arm 34 for varying the stroke or extent of oscillation imparted to the arm 29. As this arm 29 oscillates in one direction, the pusher plate 20 will be retracted and this will allow the can bodies to move forward in front of the same. When the arm is oscillated in the opposite direction, then the pusher plate 20 will move forward and push the can body off from the belt and into the pocket in the turret. The turret is timed so that it is at a standstill with the pocket in proper alinement to receive the can body when the pusher moves forward. The nozzle to be attached to the can body is indicated at N. The nozzles are placed on the can bodies, and preferably solder is fixed to the nozzle so all that is necessary for the soldering operation is to heat the solder and cause it to flow so as to properly join the solder to the can body.

Figure 2:
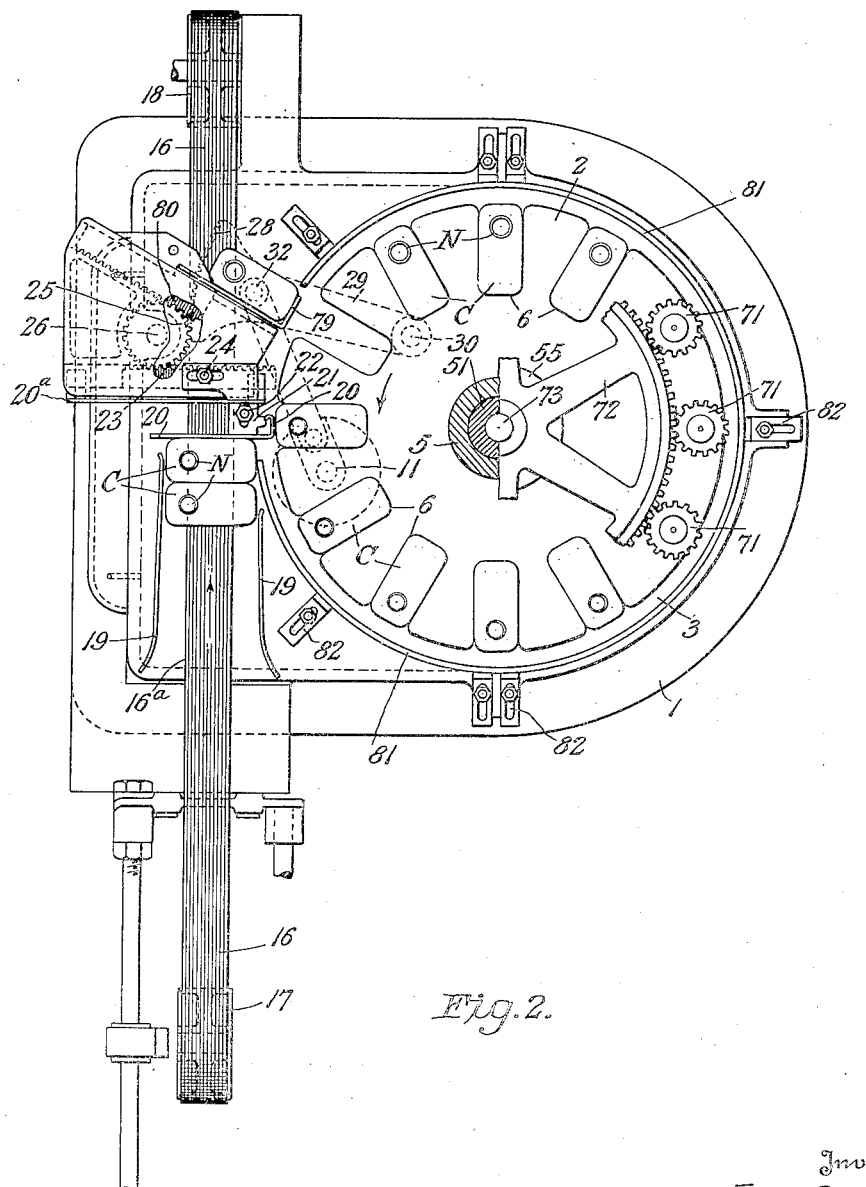
Fig. 2 is a sectional view on the line 2—2 of Fig. 1.

Directly above the turrets 2 and secured to the sleeve shaft 5 is a supporting bracket 35. Said supporting bracket 35 is provided with a series of sleeves 36. There is a sleeve above each pocket and mounted in each sleeve is a soldering unit. Only one of these units is shown in Fig. 1, while three units are shown in Fig. 2. All of the units are similar in construction, and therefore, only one of the units has been illustrated in detail. Each soldering unit consists of a cylindrical body portion 37 which is mounted so that it is free to move up and down on the rod in the sleeve support 36 therefor. Within this body portion is an electric heating unit 38. Mounted on a sleeve of insulation 39 are commutator rings 40 and 41 which are electrically connected to the heating unit 38 within the soldering iron. Each soldering iron is provided with a soldering head 42 which is provided with a central recess 43 and with an outer tapered face forming a restricted annular soldering face 44. Within the recess 43 is a tapered centering chuck 45 which is carried by a head 46 attached to a rod 47 extending upwardly through the soldering iron and supporting a weight 48 at its upper end. The weight 48 is adjustably attached to the rod 47, and its downward movement is limited by the engagement of the weight with the upper end of the cylindrical body portion 37 of the iron.

The centering chuck 45 is rigidly attached to the head 46. Said head has a depending portion which is reduced in diameter and which carries the tapered chuck 45. Surrounding this reduced portion is a sleeve 45$^a$ formed with a shoulder 45$^b$. The portion of the sleeve beneath the shoulder is of substantially the same diameter as the tapered chuck 45. The nozzle of the can is indicated at $c$. The parts are so proportioned that the tapered chuck will enter the nozzle; the sleeve also enters the nozzle until the shoulder 45$^b$ contacts with the upper end thereof. When the iron is lowered, this tapered chuck will enter the nozzle and center it relative to the soldering iron. As the can body is centered in the pocket, it will also center the nozzle relative to the can body. The sleeve engages the nozzle and the weight of the sleeve holds the nozzle pressed against the upper end of the can. When the iron continues its downward movement, the chuck head engages the sleeve, and thus the nozzle is held pressed against the top of the can by the weight 48. The soldering iron moves down over the nozzle to the position shown in Fig. 5, and this brings the headed lower end of the soldering iron into contact with the solder at the base of the nozzle. After the soldering operation has been completed the iron moves up, but the sleeve 45ª remains in engagement with the nozzle, holding the nozzle pressed against the can end. As the iron moves away from the solder, it commences to cool and set at once, and will become firmly set so as to hold the nozzle in place before the sleeve and centering chuck are lifted from engagement therewith.

The sleeve shaft 5 carrying the turrets and the bracket 35 rotates about a stationary sleeve 51 which is flanged at its lower end and secured to a cross strut 52 attached to the frame 1. The flange is secured to this cross strut by suitable bolts 53. Ball bearings 54 are placed between this cross strut and the lower side of the disk 7, so that the sleeve shaft carrying the turrets and the bracket 35 rotates on this ball bearing. Attached to the upper end of this stationary sleeve bearing 51 is a head 55 carrying a cam 56. A lever 57 pivoted to lugs 58 attached by suitable bolts to the supporting bracket 35. At the inner end of this lever 57 is a roller 59 running on the stationary cam 56. The other end of said lever is forked and carries pins 60 engaging between spaced collars 61, 61, attached to the body of the soldering iron. When the lever 57 is oscillated in a counter-clockwise direction, the arm will be raised, and when it is released by the cam, the weight of the iron will move the same downward. This cam 56 is so shaped that the iron is permitted to move downward through its own weight around the nozzle to position for engagement with the nozzle. After the soldering operation, the iron is positively raised by the cam 56.

Mounted on the lever 57 is an upstanding arm 62. This arm carries contacts 63 and 64 which make engagement with the commutators 40 and 41, respectively. Wires lead from these respective contacts to brushes 65 and 66 which make contact with the commutators 67 and 68, respectively, carried by the stationary sleeve bearing 51. Wires 69 and 70 are led up through a passage in the sleeve to these commutators 67 and 68. Thus it is that current is supplied to the soldering iron in a way that the iron is free to move up and down and it is also free to rotate.

Attached to the body of the iron is a gear wheel 71. Said gear wheel 71 meshes with a gear wheel 72 fixed to the upper end of a shaft 73. The shaft 73 extends down through the sleeve bearing 51 and is supported by a thrust bearing 74. A sprocket wheel 75 is attached to the shaft at the lower end thereof. A sprocket chain 76 runs over this sprocket wheel 75 and also over a sprocket wheel 77 attached to the shaft 11. Thus it is that the soldering iron is continuously rotated. The gear 72 has a wide face and this permits the iron to be raised and lowered without the gear 71 being unmeshed from the gear 72.

After the nozzle has been soldered to the can body, the turret brings a can body to the discharge station where an ejector plate 78 removes the can from the pocket in the turret. The turret at this time is stationary. This ejector plate is provided with a right angle portion 79 which engages the can body for drawing the same from the pocket. The ejector plate is attached to a rack bar 80 which meshes with the pinion 25. The turret brings the can body within reach of the ejector plate, which is at the inner end of its stroke, and while the turret is stopped, the pinion 25 moves the rack bar so as to retract the ejector plate, thus removing the can from the pocket in the turret. The can is carried back on to the traveling belt, and the traveling belt conveys it out of the machine. A guard rail 81 carried by adjustable angle plates 82 surrounds the turret and may be so disposed as to hold the cans in their pockets.

It is thought that the operation of the machine will be obvious from the above description. The turret rotates step by step, and while it is stationary, a can is placed in a pocket and the pocket is so shaped as to hold the can body in a predetermined set position beneath the soldering unit associated with the pocket. As the turret is traveling step by step, the iron is lowered through the stationary cam 56, releasing the same so that it moves down over the nozzle. The centering chuck centers the nozzle before the iron reaches a position where it will melt the solder and bring about the bonding of the nozzle to the body of the can. Any suitable means may be used for applying flux to the nozzle. This may be done in a separate machine, or it could be accomplished in the present machine. The solder, as noted, is preferably attached to the nozzle base by dipping or otherwise, so that when the iron is lowered over the solder, and the solder seamed thereto, a solder bond will be established which firmly secures the nozzle to the body. As the iron moves upward, the solder begins to cool, and while it is cooling, the chuck, which is weighted, holds the nozzle firmly pressed against the can body, insuring that it will stay in proper position until the solder sets. A further upward movement of the iron, lifts the centering chuck from engagement with the nozzle, and the soldering operation is completed. The turret continues its rotation until the can is brought into proper position for the ejector to strip the can from the pocket.

While the machine has been described as constructed for attaching nozzles to can bodies, it will be understood that by suitable modification of the parts, it may be used for other purposes, such as the attaching of ears to pails and the like. It is also obvious that minor changes in the details of construction and the arrangement of the parts may be made without departing from the spirit of the invention as set forth in the appended claims.

Having thus fully described the invention, what we claim as new and desire to secure by Letters Patent, is—

1. The combination of a series of traveling electrically heated soldering units, means for positioning the article to be soldered beneath the soldering units, means for placing the article in the positioning means, means for moving the soldering units into and out of contact with the article to be soldered, and means for removing the article from the positioning means after it is soldered.

2. The combination of a rotatable turret having a series of positioning pockets therein, means for intermittently rotating said turret, means for feeding an article to be soldered in the pocket of the turret, an electrically heated soldering unit located above each pocket and traveling with the turret, and including a soldering iron, a chuck associated with said iron for engaging the part to be soldered, means for moving said chuck and iron into and out of contact with the part to be soldered, and means for removing the soldered article from the turret.

3. A soldering machine including in combination a traveling electrically heated soldering unit having a soldering iron provided with a recess in the lower face thereof forming an annular soldering applying surface, a chuck located in said recess, means for yieldingly depressing said chuck, means for limiting its downward movement, means for raising and lowering the soldering iron and for causing said chuck to engage the part to be soldered for centering and holding the same while it is being soldered and after the iron is moved away from the part and the solder has cooled and set.

4. A nozzle soldering machine including in combination a traveling soldering iron having a recess in its lower face adapted to receive the nozzle, a centering chuck located in said recess adapted to enter and to center the nozzle on the container to which it is to be attached.

5. A nozzle soldering machine including in combination a traveling soldering iron having a recess in its lower face adapted to receive the nozzle, a centering chuck located in said recess adapted to enter and to center the nozzle on the container to which it is to be attached, said centering chuck having means for engaging the nozzle for pressing the same against the container, means for yieldingly depressing said chuck, said chuck having a limited movement relative to the iron whereby when said iron is moved away from the base of the nozzle, said chuck holds the nozzle pressed against the container until the solder cools and sets.

6. A nozzle soldering machine including in combination an intermittently rotatable turret having positioning pockets therein, means for placing containers in said pockets with the nozzles applied thereto, a soldering unit directly above each pocket having a soldering iron adapted to move down over the nozzle for heating and applying solder to the base of the nozzle, means for holding the nozzle pressed against the container during the soldering thereof, means for moving the soldering iron into and out of soldering contact with the nozzle during the rotation of the turret, and means for removing the containers from the pockets after the nozzles have been soldered to the containers.

7. A soldering machine including a traveling soldering unit having an iron provided with a recess forming an annular soldering face, means for raising and lowering said iron, means for electrically heating said iron, a rod extending centrally through said iron and carrying a weight at its upper end, and a centering chuck carried by said rod for centering the part to be soldered relative to the container to which it is to be attached.

8. A soldering machine including a traveling soldering unit having an iron provided with a recess forming an annular soldering face, means for raising and lowering said iron, means for electrically heating said iron, a rod extending centrally through said iron and carrying a weight at its upper end, and a centering chuck carried by said rod for centering the part to be soldered relative to the container to which it is to be attached, said centering chuck having a movable sleeve adapted to engage the nozzle and press the nozzle against the container.

9. A nozzle soldering machine including in combination a traveling soldering iron having a recess in its lower face adapted to receive the nozzle, and a centering chuck associated with said soldering iron and operating to center the nozzle on the container to which it is to be attached.

In testimony whereof, we affix our signatures.

JOHN COYLE.
WALTER PLUMB.